United States Patent

Browne

[11] Patent Number: 5,880,567
[45] Date of Patent: Mar. 9, 1999

[54] SERVOMECHANISM WITH POSITION/RATE CONTROL

[75] Inventor: Anthony D Browne, Bristol, Great Britain

[73] Assignee: Matra BAe Dynamics (UK) Ltd., Hertfordshire, United Kingdom

[21] Appl. No.: 697,592

[22] Filed: Aug. 27, 1996

[30] Foreign Application Priority Data

Jun. 21, 1996 [GB] United Kingdom .................. 9613038

[51] Int. Cl.$^6$ ................................................ G05B 13/00
[52] U.S. Cl. ............................................ 318/561; 318/620
[58] Field of Search ...................... 318/560, 632, 318/561, 799–815; 388/811; 311/620, 621, 615, 619

[56] References Cited

U.S. PATENT DOCUMENTS

| | | |
|---|---|---|
| 3,916,275 | 10/1975 | Plunkett et al. .................. 318/802 |
| 3,935,523 | 1/1976 | Cleveland et al. . |
| 4,369,400 | 1/1983 | Turner et al. . |
| 4,694,229 | 9/1987 | Cormack .................. 318/561 |
| 5,175,483 | 12/1992 | Fujii et al. .................. 318/807 |
| 5,325,028 | 6/1994 | Davis .................. 318/560 |
| 5,343,131 | 8/1994 | Baumann .................. 318/561 |
| 5,398,298 | 3/1995 | Ensor .................. 388/811 |
| 5,485,065 | 1/1996 | Kaneko et al. .................. 318/270 |
| 5,508,596 | 4/1996 | Olsen .................. 318/569 |

FOREIGN PATENT DOCUMENTS

| | | |
|---|---|---|
| 0 034 229 A1 | 8/1981 | European Pat. Off. . |
| 0 101 051 A2 | 2/1984 | European Pat. Off. . |
| 1022882 | 3/1966 | United Kingdom . |
| 1 252 640 | 11/1971 | United Kingdom . |
| 1382907 | 2/1975 | United Kingdom . |

*Primary Examiner*—Jonathan Wysocki
*Attorney, Agent, or Firm*—Nixon & Vanderhye PC

[57] ABSTRACT

A servomechanism is controlled to move at a rate below a critical limit by means of a feedback controller (10) which is responsive to the output of a rate measurement device (9). The feedback controller (10) has a non-linear response whose effect only becomes appreciable when the measured rates approach the critical limit. Operation within the critical limits ensures stable and accurate operation of the servomechanism.

9 Claims, 5 Drawing Sheets

SERVOMECHANISM WITH POSITION/RATE CONTROL

BACKGROUND OF THE INVENTION

1. Field of the Invention

This invention relates to servomechanisms and particularly to such mechanisms for controlling the position of a payload.

2. Discussion of Prior Art

One position control mechanism known to the inventor operates using feedback from an appropriate position measurement device such as a linear transducer, resolver or optical encoder to control a D.C. motor. Often, the DC motor is configured as a torquer by employing an inner feedback loop to control the armature or field current. One example of such a known system is shown in FIG. 1.

In FIG. 1, a torquer 1 comprising a current controller 2 and DC motor 3, is fed with a torque demand signal $T_d$. The torque demand is produced by an angle controller 4 which acts on an angular error signal 'E', formed from the difference between demanded and achieved angular position θd and θa respectively. The achieved angular position θa is monitored by an angular measurement device 5. The torquer 1, operating within limits resulting from the supply voltage within the current controller 2, applies torque to a load 6 in order to drive the error signal E to zero. The load 6 could be a gimbal mechanism, for example.

The inventor has found that the angular measurement devices in common use give false readings when driven above a critical rate. When this rate is exceeded, not only does the known system have the disadvantage of providing an inaccurate value of angular position θa, but also, it has been observed that the effect leads to instability in the feedback loop.

SUMMARY OF THE INVENTION

The present invention aims to provide a servomechanism which ensures that the critical rate of a position measurement device incorporated therein is not exceeded.

This invention thus comprises a servomechanism for controlling the position of a payload, said servomechanism including:

- a position measuring device for measuring the position of the payload;
- feedback control means for comparing the measured position of the payload with a wanted position to produce a payload driving signal;
- means for driving the payload to the wanted position in response to said payload driving signal;
- means for determining the driven rate of movement of the payload;
- and additional feedback control means for applying a correction term to the payload driving signal, dependent on the magnitude of said driven rate.

In the preferred embodiment, the additional feedback control means has a non-linear response and has little effect until driving rates approach the critical limits of the position measuring device.

The means for determining the driven rate of movement of the payload could comprise a tachogenerator or alternatively rate could be derived by differentiating the output of the position measuring device. In the latter case, said means could comprise a digital filter with differential action.

BRIEF DESCRIPTION OF THE DRAWINGS

Some embodiments of the invention will now be described, by way of example only, with reference to the drawings of which.

DETAILED DISCUSSION OF PREFERRED EMBODIMENTS

Figure 1:
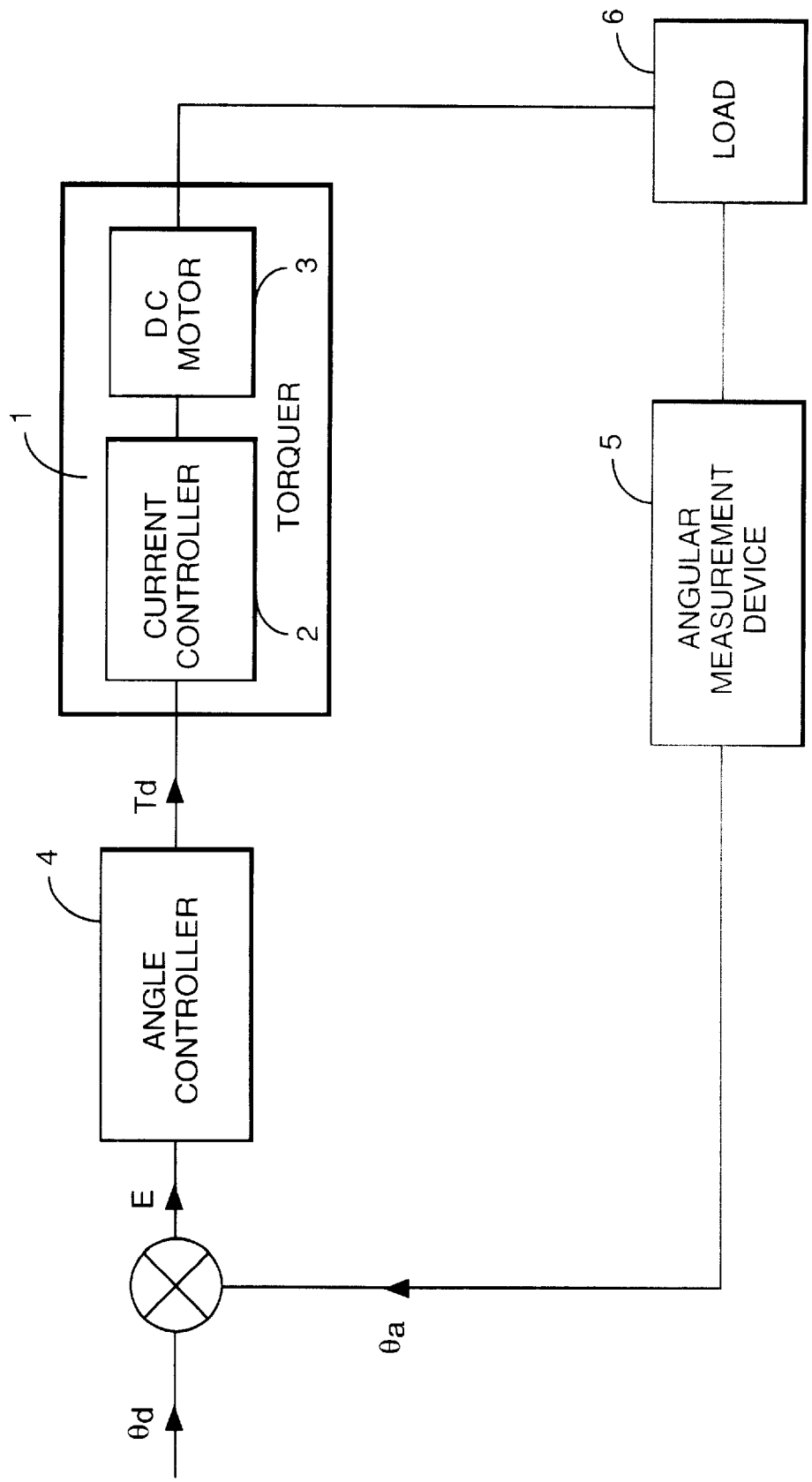
FIG. 1 is a schematic block diagram of a known servomechanism.
Figure 2:
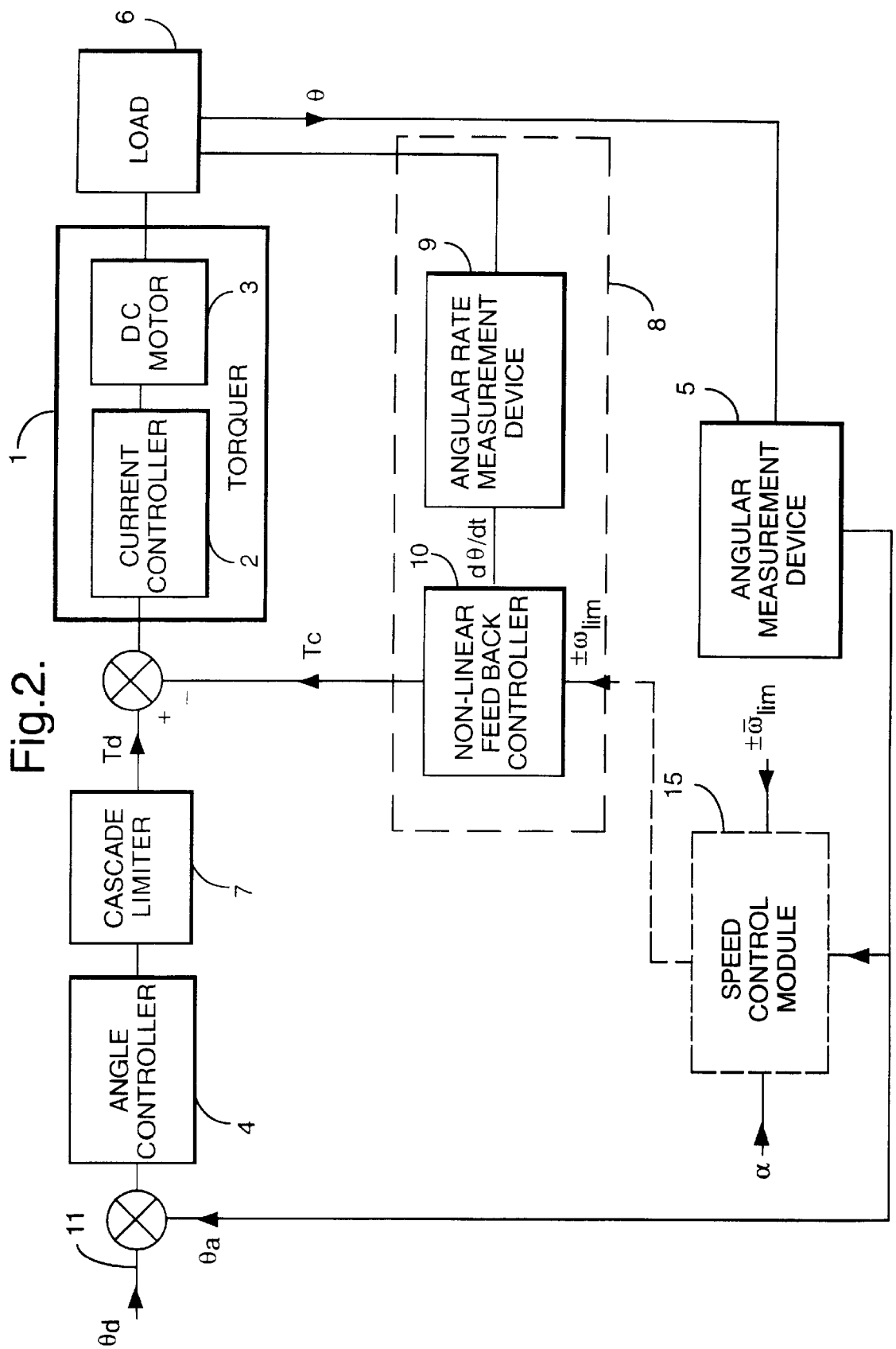
FIG. 2 is a schematic block diagram of a servo mechanism in accordance with the invention.

FIG. 2 represents a servomechanism for controlling the angular position of a load and has several elements in common with the known system of FIG. 1 already discussed above. Common elements are a torquer 1 (comprising a current controller 2 and DC motor 3), an angle controller 4, angular measurement device 5 and load 6. These common elements operate in a similar manner to the known system. In addition, FIG. 2 shows a cascade limiter 7 connected to the output of the angle controller 4 and an additional feedback loop 8. The loop 8 comprises an angular rate measurement device 9, and a non-linear feedback controller 10.

The operation of the servomechanism of FIG. 2 is as follows.

Figure 3:
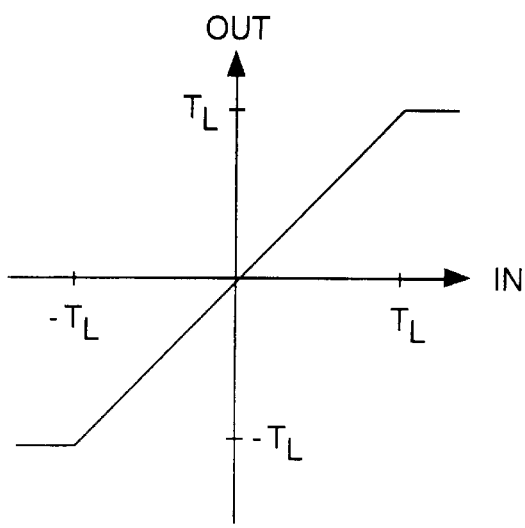
FIG. 3 is a graph showing the input-output characteristics of a cascade limiter incorporated in the servomechanism of FIG. 2.

Angular position θ of the load 6 is constantly monitored by the angular measurement device 5 whose output θa is compared with an angle demand signal θd on line 11. From this comparison, the angle controller 4 and angle limiter 7 derive a suitable torque demand signal Td, in response to which, the torquer 1 drives the load towards the desired angular position set by the demand signal. The cascade limiter 7 has the function shown in the graph at FIG. 3 where $-T_L$ and $+T_L$ are the lower and upper torque limits of the torquer 1. Its purpose is to ensure that the torque demand does not exceed the capabilities of the torquer 1.

Figure 4:
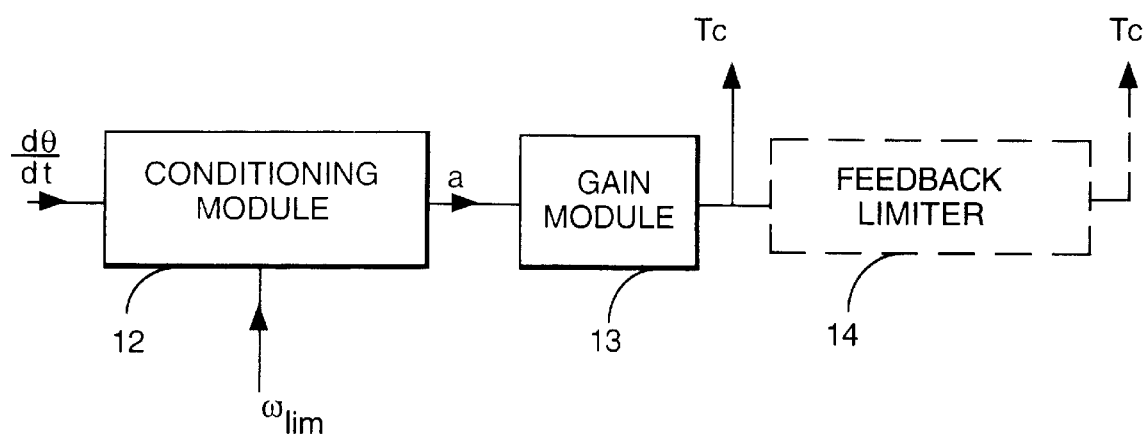
FIG. 4 is a block diagram of the constituent parts of a feedback controller incorporated in the servomechanism of FIG. 2.

The angular measurement device 5 has upper and lower critical rate limits $\pm\omega_{lim}$, in excess of which, its output is inaccurate. The function of the feedback controller 10 is to ensure that the operational speed is kept within these limits. Referring to FIG. 4, the feedback controller's operation can be described in terms of two functional blocks: viz a conditioning module 12 and a gain module 13.

The conditioning module 12 has inputs $\pm\omega_{im}$ (which is a pre-set value) and dθ/dt from the rate measuring device. The conditioning module's function is non-linear and has an input-output mapping of the form:

$$u = \left(\frac{\omega}{\omega_{lim}}\right)^N$$

where u is the output of the function.

ω is the measured angular rate i.e. dθ/dt $\omega_{lim}$ is the required angular rate limit N is an odd integer exponent, preferably 5 or 7.

Figure 5:
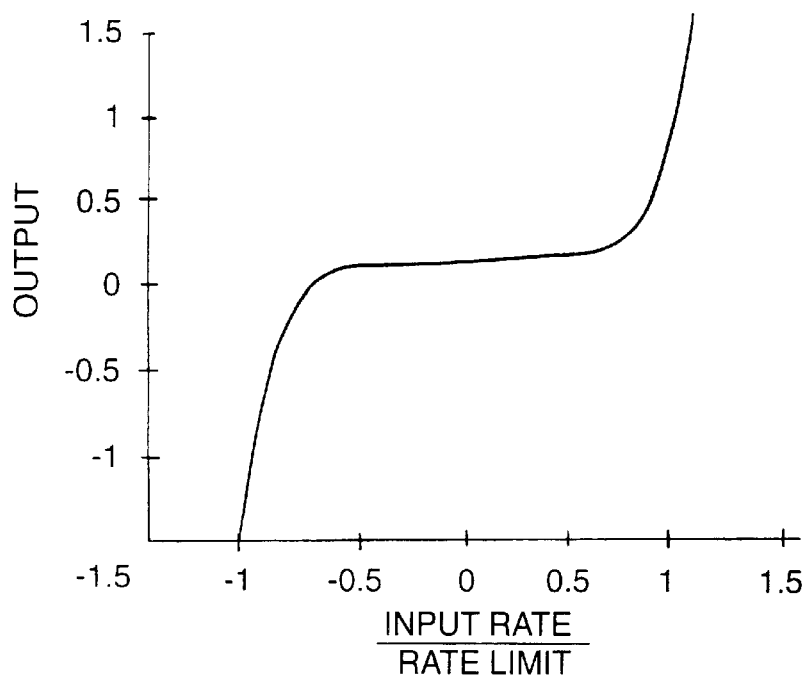
FIG. 5 is a graph showing the operation of the feedback controller of FIG. 4.

A graphical representation of the response of the conditioning function for N=7 is shown at FIG. 5. Its output has a rapidly increasing value and slope as the rate limit is approached.

As can be seen from FIG. 5, the output of the conditioning module 12 is very small in amplitude except when the amplitude of the input rate ω is close to or exceeds the critical rate $\omega_{lim}$.

Referring again to FIGS. 4 and 2, the output of the conditioning module 12 is normalised by the gain module 13 whose gain factor is set to $T_L$ (the torque limit).

Thus the output of the feedback controller 10 is a torque demand correction signal $T_c$ which is subtracted from the torque demand signal Td appearing at the output of the angle limiter 7.

When the operational speed of the servomechanism is within the pre-set limits $\pm\omega_{lim}$ the feedback controller 10 has very little effect on the torque demand signal and the output from the cascade limiter 7 goes through to the torquer 1 with little correction. However, as the operational speed closely approaches $\pm\omega_{lim}$ the output from the gain module 13 will rapidly increase and serve to oppose the torque demand signal from the angle limiter 7. This results in a reduced amplitude of torque demand signal applied to the torquer 1 or in extreme cases a torque sign reversal. At the maximum allowed operating rate, the outputs of the cascade controller 7 and the gain module 13 cancel leaving zero torque demand. Therefore the servomechanism will cease to accelerate beyond the critical limit as it works towards reaching the desired angle value, and its operating speed will be kept within the critical limits by the action of the feedback controller 10.

In an alternative embodiment, the feedback controller 10 is provided with a further output stage which is connected to the output of gain module 13. This further stage is shown ghosted in FIG. 4 and is designated as a "feedback limiter" 14.

Figure 6:
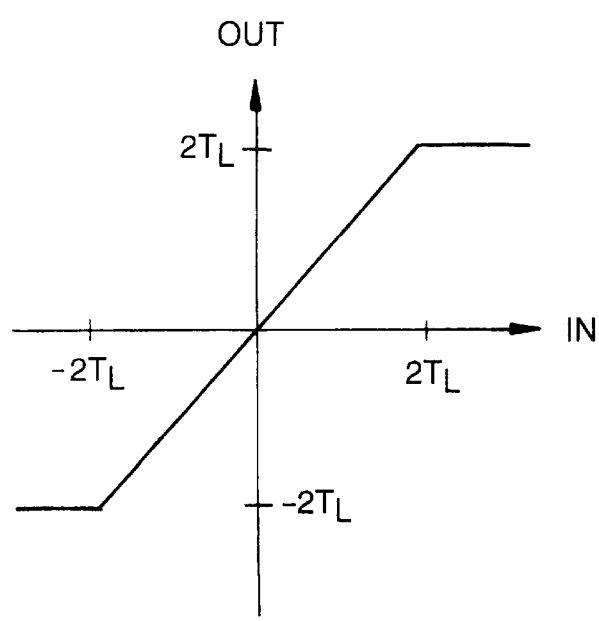
FIG. 6 is a graph showing the input-output characteristics of a feedback limiter incorporated in a particular embodiment of the servomechanism of FIG. 2.

This can be set to ensure that total torque demand stays within the torque limit. The value of the feedback limiter 14 should exceed that of the cascade limiter 7 to ensure that any disturbance cannot cause overspeed. In this example, the feedback limiter 14 has its limits set at $\pm 2T_L$ (see FIG. 6).

In a further embodiment, the servomechanism of FIG. 2 can be configured in order to prevent the moving parts of the load 6 from hitting their end stops at a speed that could result in shock damage.

This is achieved by the incorporation of a speed control module 15 shown ghosted in FIG. 2 which monitors angle $\theta_a$, measured by the angular measurement device 5, and also has stored therein, the value $\omega_{lim}$, the nominal angular rate limit of the angular measurement device 5 and a value α which is the acceleration capability of the servomechanism.

The speed control module 15 outputs of value of $\omega_{lim}$ to the feedback control module 10 which is either equal to $\omega_{lim}$ or equal to $\sqrt{2\delta\alpha}$ (where δ is the angular distance from the end stop).

whichever has the smaller value.

Figure 7:
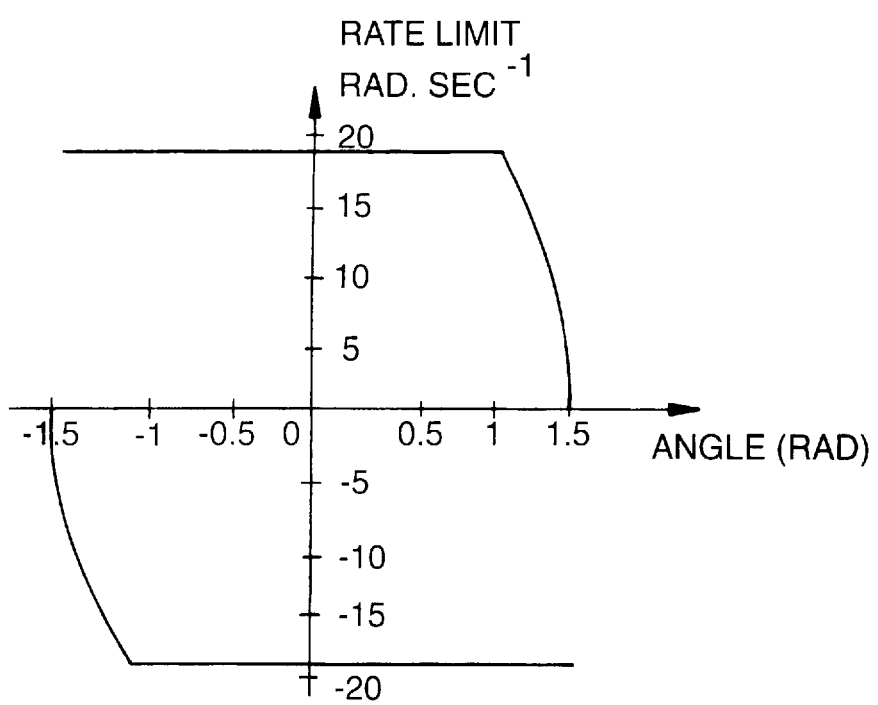
FIG. 7 is a graph showing an example of rate limits imposed on a particular embodiment of the servomechanism of FIG. 2.

Two limit values are produced, corresponding to angular distances to positive and negative end-stops. FIG. 7 shows an example of the profiles of the positive and negative speed limits for end-stops at 90 deg.

Thus the servomechanism will slow down to safe speed limit as it approaches its end stops.

In applications where the above function is difficult to implement a simpler function may suffice such as a linear decay to zero.

The option of the feedback limiter 14 may or may not be incorporated within this further embodiment.

Although the above embodiments have been described in relation to servomechanisms operating to control an angular position of a load, it will be apparent to those skilled in the art that the novel and inventive principles described herein are equally applicable to translational measurements and control.

A further advantage of the invention is that it allows the cascade limiter 7 to be embodied as a simple linear network whilst still providing good dynamical response to step input demands.

I claim:

1. A servomechanism for controlling the position of a payload, said servomechanism including:

a position measuring device for measuring the position of the payload;

feedback control means for comparing the measured position of the payload with a wanted position to produce a payload driving signal;

means for driving the payload to the wanted position in response to said payload driving signal;

means for determining the driven rate of movement of the payload;

and additional feedback control means for applying a correction term to the payload driving signal, dependent on the magnitude of said rate.

2. A servomechanism as claimed in claim 1 in which the additional feedback control means has a non-linear response function.

3. A servomechanism as claimed in claim 2 in which said non-linear response function has the form:

$$u = \left( \frac{\omega}{\omega_{lim}} \right)^N$$

where ω is the driven rate of the payload, $\omega_{lim}$ is a preset rate limit, and N is an odd integer.

4. A servomechanism as claimed in claim 3 in which the value for N is set at 5.

5. A servomechanism as claimed in claim 3 in which the value for N is set at 7.

6. A servomechanism as claimed in claim 1 in which the means for determining the driven rate of movement of the payload is a tachogenerator.

7. A servomechanism as claimed in claim 1 in which the means for measuring the position of the payload is an angle measurement device.

8. A servomechanism as claimed in claim 1 in which the additional feedback control means includes a torque limiting stage.

9. A servomechanism as claimed in claim 1 and further including speed control means for reducing the driven rate of movement of the load as the load approaches its end stops.

* * * * *